US006983258B1

(12) United States Patent
Tye et al.

(10) Patent No.: US 6,983,258 B1
(45) Date of Patent: Jan. 3, 2006

(54) TRADING INFORMATION MANAGING SYSTEM AND SOFTWARE INCLUDING A COMMUNITY MANAGEMENT FUNCTION

(75) Inventors: Peter Francis Tye, London (GB); Penelope Ann Melrose, Middlesex (GB); David Maxted, London (GB); Robert Patterson, Middlesex (GB); Lindsay Smith, London (GB)

(73) Assignee: G.E. Information Services, Inc., Gaithersburg, MD (US)

( * ) Notice: Subject to any disclaimer, the term of this patent is extended or adjusted under 35 U.S.C. 154(b) by 757 days.

(21) Appl. No.: 09/593,687

(22) Filed: Jun. 14, 2000

(30) Foreign Application Priority Data

Jun. 14, 1999 (GB) .............................................. 9913790
Jul. 15, 1999 (GB) .............................................. 9916640

(51) Int. Cl.
*G06F 17/60* (2006.01)

(52) U.S. Cl. ................................ 705/37; 705/1; 705/7; 705/9; 705/10

(58) Field of Classification Search ............. 705/37–42, 705/26, 27, 10, 1, 21
See application file for complete search history.

(56) References Cited

U.S. PATENT DOCUMENTS

| | | | | |
|---|---|---|---|---|
| 4,992,940 A | * | 2/1991 | Dworkin ...................... | 235/383 |
| 5,053,956 A | * | 10/1991 | Donald et al. ............... | 348/599 |
| 5,974,395 A | | 10/1999 | Bellini et al. .................. | 705/9 |
| 6,067,525 A | * | 5/2000 | Johnson et al. ................ | 705/10 |
| 6,327,594 B1 | * | 12/2001 | Van Huben et al. .......... | 707/10 |
| 6,397,191 B1 | * | 5/2002 | Notani et al. ................... | 705/9 |
| 6,434,544 B1 | * | 8/2002 | Bakalash et al. ............. | 707/10 |
| 2002/0161688 A1 | * | 10/2002 | Stewart et al. ................ | 705/37 |

FOREIGN PATENT DOCUMENTS

| | | |
|---|---|---|
| GB | 2 302 427 | 1/1997 |
| GB | 2 316 506 | 2/1998 |
| WO | 99/10825 | 3/1999 |
| WO | 99/45486 | 9/1999 |

OTHER PUBLICATIONS

Solving Business Problems using Process Based Solutions, Hewlett–Packard Changengine Operation, Version 1.3–May 7, 1999, 8 pages.
Tesco/GEIS Case Study, 7 pages, May 27, 1999.

* cited by examiner

*Primary Examiner*—Jeffrey Pwu
(74) *Attorney, Agent, or Firm*—Foley & Lardner LLP

(57) ABSTRACT

A trading information exchange system includes a gateway allowing access of suppliers and retailer workstations and retailer systems to a backbone sub-system. An application layer interacts with a work flow engine via a supporting framework and a commerce platform. The latter have direct access to the gateway for monitoring supplier and retailer accesses and to the database for logging purposes. Collaborative applications comprise a timer program interacting with a work queue in the work flow engine. The timer program operates on a test-and-wait or a test-and-return basis. A community management function interacts with the work flow engine to define roles and the roles are linked with activities in process nodes. Each process node comprises an activity, case packet item variables, and rules defining routing of the activities to the work queues.

21 Claims, 3 Drawing Sheets

TRADING INFORMATION MANAGING SYSTEM AND SOFTWARE INCLUDING A COMMUNITY MANAGEMENT FUNCTION

BACKGROUND OF THE INVENTION

The invention relates to a trading information exchange system for the retail industry.

In recent years, the retail industry has developed models to improve its operation. Two such models are Efficient Consumer Response (ECR) and Collaborative Forecasting, Planning, and Replenishment (CPFR). These models are based on the fundamental premise that retailers and suppliers must engage in greater collaboration in order to achieve significant improvements in supply chain efficiencies, and to match the increasing levels of service demanded by consumers. The ECR model is primarily used in Europe and the CFPR model in USA. However, they are broadly similar.

British Patent Specification Nos. GB2302427A and GB2316506A describe systems for management of supply chains and demonstrate that a good deal of work has been carried out in the field of interchange of data. However, these systems do not provide the level of collaboration and controlled integration of the supply chain parties required by models such as the ECR model above.

There is therefore a need for a trading information exchange system to help implement such a model by:
  eliminating administrative time and effort maintaining paper-based reference data,
  reacting immediately to unforeseen changes in consumer demand or external circumstances, and
  maximising the efficiency and effectiveness of key collaborative processes such as promotions management and new product introduction.

SUMMARY OF THE INVENTION

The invention provides a trading information exchange system comprising:
  an application layer comprising applications,
  a supporting framework of services for the applications,
  a database,
  a collaborative work flow engine accessible by the applications,
  a gateway comprising means for allowing supplier and retailer access to the applications,
  means in the supporting framework for allowing access of the applications to the work flow engine for work flow processing, and
  means in the supporting framework for accessing the gateway for monitoring supplier and retailer access to the applications.

In one embodiment, the gateway comprises a firewall for security of accesses.

In one embodiment, the gateway comprises a proxy server comprising means for handling retailer and supplier accesses and for routing access requests through a selected application.

In one embodiment, the gateway comprises a router comprising means for allowing import of data from a retailer to the database in a structured manner.

In one embodiment, the applications, the database, and the work flow engine reside on separate servers interconnected in a network.

In one embodiment, the gateway is linked to the application server.

In one embodiment, the supporting framework comprises a remote data transfer function comprising means for accessing the gateway to monitor transfer of data from retailer and supplier systems and for reporting to an application.

In one embodiment, the supporting platform comprises error handling, audit log, and exception handling functions comprises means for accessing the database, processing retrieved data, and for reporting to an application.

In another embodiment, the supporting framework comprises a community management function for interacting with a commerce platform to relate database user records to roles in the work flow engine.

In one embodiment, the community management function comprises means for associating roles with activities.

In one embodiment, the system further comprises an applications server comprising means for dynamically distributing load across hardware resources.

In one embodiment, the applications server resides between the commerce platform on one side and the database and the work flow engine on the other.

In a further embodiment, the applications and the work flow engine comprise means for interfacing to control work flow with process nodes, each node comprising an activity, a variable, and rules defining routing of an activity to a work queue.

In one embodiment, the system further comprises a timer comprising means for controlling exit from a process node or entry to a process node according to activity status.

In one embodiment, said timer comprises a timer program in an application and a work queue in the work flow engine, said timer program comprising means for accessing the work queue to determine activity status.

In another embodiment, said timer program comprises means for:
  opening an activity in the work queue,
  obtaining status data from the activity,
  performing a time comparison,
  setting a value indicating the result of the comparison, and
  submitting the activity for completion of the process node if the time comparison fulfils a condition.

In one embodiment, said timer program comprises means for performing a test and return operation in which it accesses a work queue and waits for completion of an activity before activating a next process node.

In one embodiment, said timer program comprises means for performing a test and return operation in which it accesses a work queue and immediately checks the activity status.

In one embodiment, the supporting framework comprises community management means for defining for the work flow engine service users, an application view of the service users, containment of each service user in a team, and a role for a service user.

In one embodiment, the community management means further comprises means for defining a flavour for each team, each flavour being a collection of roles.

In one embodiment, wherein roles are variants of role types.

In one embodiment, the community management means comprises means for defining role types in both the work flow engine and in an application.

In one embodiment, the community management means comprises means for defining activities for each role and each activity has an associated code.

BRIEF DESCRIPTION OF THE DRAWINGS

The invention will be more clearly understood from the following description thereof given by way of example only with reference to the accompanying drawings, in which.

DETAILED DESCRIPTION OF THE INVENTION

Figure 1:
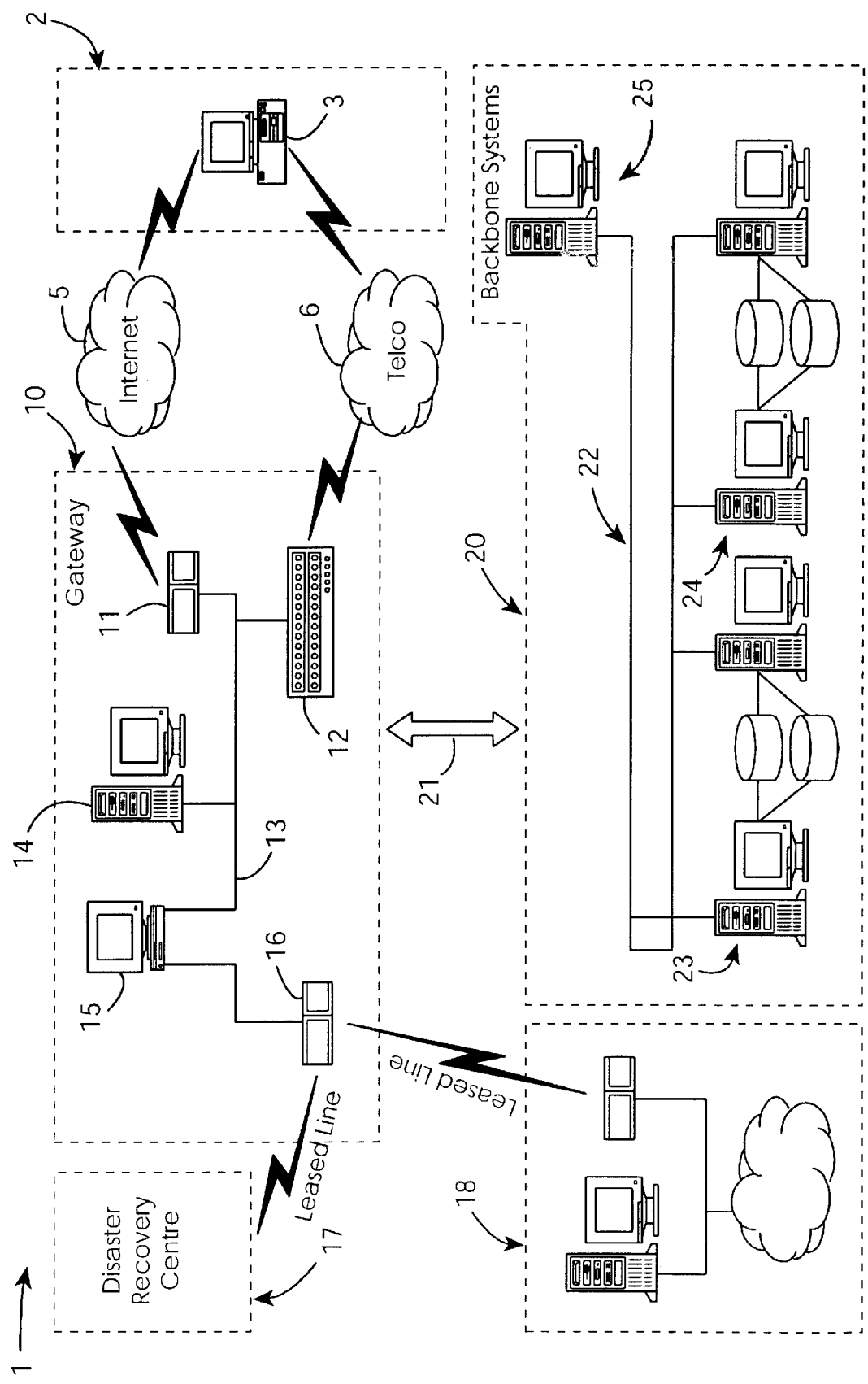
FIG. 1 is a diagram illustrating the hardware structure of a trading information exchange system of the invention.

Referring to the drawings, a retail trading information exchange system 1 of the invention is accessed by supplier and retailer workstations 2 for data access and by retailer systems 18 for importing data. The system 1 comprises:

- a gateway 10 providing secure access to the systems 2 and 18,
- a disaster recovery centre 17, and
- a backbone sub-system 20.

In more detail, the workstations 2 comprise various workstations in supplier and retailer premises such as PCs 3. These communicate via the Internet 5 or a telecommunications link 6 with the gateway 10 to perform enquiries such as sales performance report enquiries.

The gateway 10 comprises an external access router 11 for Internet interfacing and a remote access server 12 for telecommunications link interfacing. These are connected in a 100BaseT resilient LAN 13, which links them to a Web server/proxy server 14 and a firewall 15. The firewall 15 is connected by a link 21 to the backbone sub-system 20. However, connections are also made via a router 16 and leased lines to a disaster recovery centre 17 and to the retailer systems 18.

The gateway 10 provides for comprehensive access by all parts to the supply chain with excellent access control and security provided by the firewall 15. It also handles accesses by the workstations 2 in a controlled manner for the backbone sub-system 20.

The backbone sub-system 20 comprises a 100BaseT resilient LAN 22 linking the following:

- a database server 23,
- a work flow engine 24, and
- an applications server 25 linked with the gateway 10.

Figure 2:
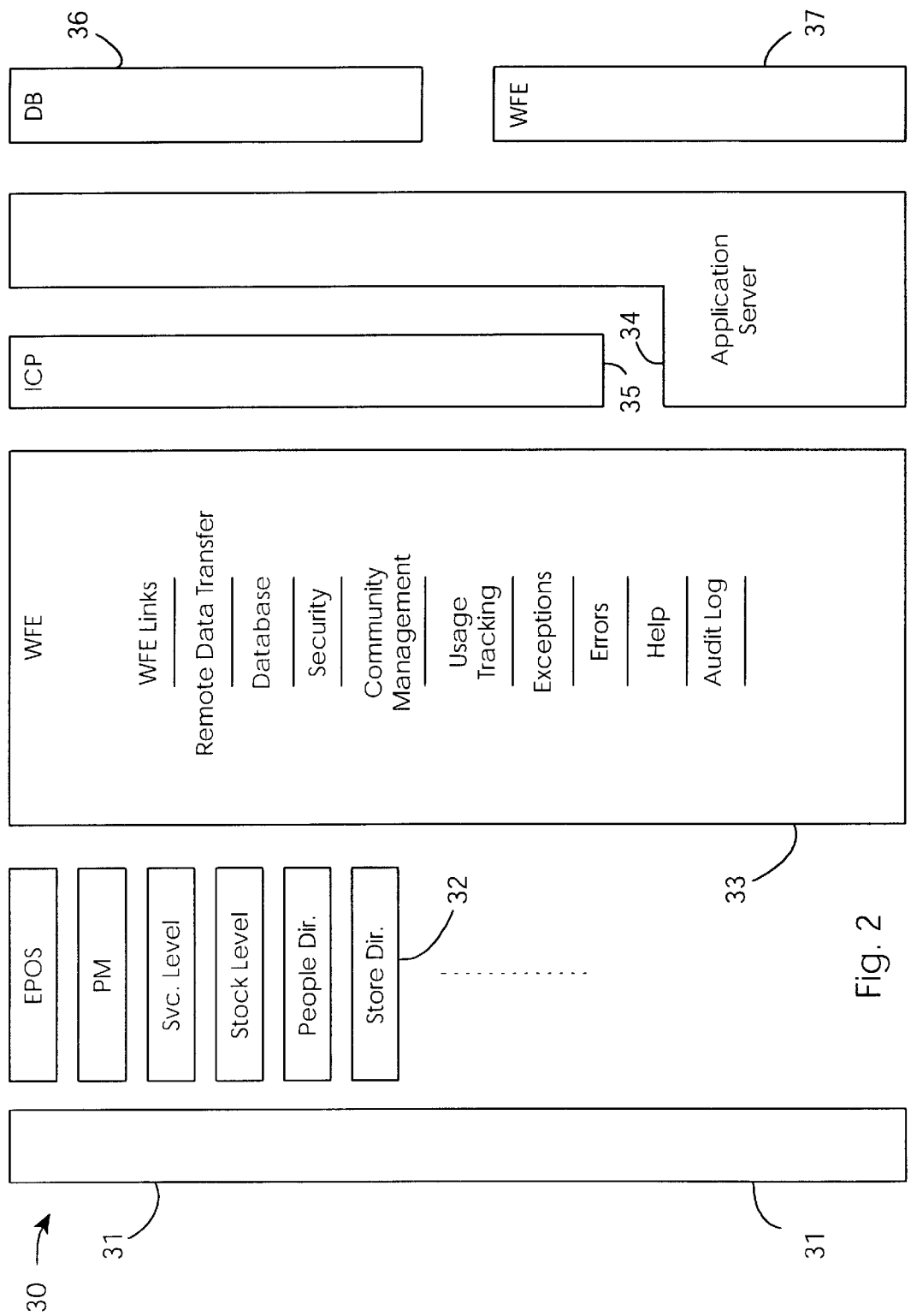
FIG. 2 is a diagram illustrating the software architecture of a backbone sub-system of the trading information exchange system.

Each component comprises at least two processors, for resilience. The backbone sub-system 20 provides the core functionality of the system 1, as illustrated in FIG. 2. The architecture 30 comprises:

- a presentation layer 31 with GUI interfaces set by the applications,
- an applications layer 32 having applications such as EPOS, promotions management, service level, stock level, people directory, and store directory applications,
- a supporting framework 33,
- an application server 34,
- an Internet commerce platform (ICP) 35,
- a database 36, and
- a collaborative work flow engine 37.

The architecture of the system 1 allows it to integrate with other systems so that trading information exchange processing is distributed. The data transfer may use on-line or off-line techniques using EDI (Electronic Data Interchange). The work flow engine 37 and the applications operate in response to received data so that processing is distributed.

The backbone sub-system 20 use this basic architecture to manage storage and retrieval of static information by applications accessing the database 36. They also manage dynamic provision of data using applications such as EPOS and stock level applications. One aspect is handling of key collaborative applications such as promotions management and new product introduction using the relevant application 32, the supporting framework 33, the ICP 35, the work flow engine 37, and the database 36.

The system 1 takes a particular business function such as promotions management through a controlled process which provides the necessary structure and coordination, but also allows excellent flexibility. For example, the ECR industry standard model defines major steps for promotions management (PM) as follows:

- strategic planning and selection,
- tactical planning and selection,
- implementation (initial and subsequent forecasting),
- in-store execution, and
- evaluation.

Each application 32 handles a business process which may or may not involve use of the WFE 37. For example, the EPOS application does not involve use of the WFE 37.

The Promotions Management (PM) application uses the WFE 37 to drive activities according to the PM process. Such an application is initialised by (a) loading the application on the supporting framework 33, and (b) loading a compiled process into the WFE 37. The compiled process comprises process nodes, each comprising:

- an activity such as a document to be completed or a database fetch,
- a case packet item variable associated with each activity, and
- rules controlling how the activity is routed to a work queue in the WFE 37.

A timer drives completion of activities to perform a process. A timer comprises:

- a timer program in the application, and
- work queues in the WFE 37 associated with the process and having a process identifier identifying it as such.

Thus, in summary, a process has process nodes in the WFE 37, each process node comprising activities, variables, and rules. The rules route the activities to work queues in the WFE 37. The process also comprises timers, each comprising a timer program in the application and the associated work queues in the WFE 37. There are three types of timer programs as follows:

(a) delaying an activity until a calculated time, (b) testing whether a condition relating to time is met, and (c) allowing variable length time for completion of an activity.

For type (a), the timer issues a notification to allow an activity after a pre-set time has elapsed. For type (b), the activity is placed before a route node to set a status flag to indicate whether a tested for time condition has been met and respond appropriately. For example, review loops must be completed within a number of weeks before a promotion is due to start. Timer (c) is a variant of (b). An activity is placed in parallel to allow a process to respond to an activity taking longer than an allowed time.

A semi-automatic timer program involves a script executing periodically to check if activities have been completed. An automatic timer program:
- opens an activity,
- obtains the necessary data from the activity,
- performs the time comparison,
- if necessary, sets a single value indicating the result of the comparison, and
- if appropriate, submits the activity for completion of the process node.

The timer programs are of the following types:
- test and return, in which a time condition is tested with an immediate return indicating true or false, and
- test and wait, in which a time condition is tested and a return is made only when the condition is met.

These operations allow the application to drive processes because they can use the WFE 37 for the lower-level work flow processing in a flexible manner. The actions which take place following the work queue accesses by the timer program are completely configurable within the application.

The following are examples of case packet item variables of process nodes, in which RO means read only, and RW means read/write:
- TIMER_Condition (string: RO) describes the time condition being tested
- TIMER_ConditionFlag (integer: RW) set to 1 if the time condition is true
- TIMER_StatusCode (integer: RW) set to 0 if the condition was evaluated normally, and error code otherwise
- TIMER_Now (optional string or integer: RW) set to the internal representation of the time when the condition was last evaluated
- TIMER_FirstTimed (optional string or integer: RW) set to the internal representation of the time when the condition was first evaluated
- TIMER_DiagnosticMessage (optional string: RW) set to a human readable message if there are any problems evaluating the condition The following extension should be allowed so that concurrent timer activities in the same process may run:
- TIMER_DataNames (string list: RO) is a list of strings allowing the default case packet names to be changed. Each string is of the form:
- Default_name=Alternative_name
- Where default_name is the part after TIMER_ and the alternative name is the name of a different case packet item to use. For example, an entry of 'ConditionFlag=ForecastDeadlineReached' means that the value of ForecastDeadlineReached should be set to 1 if the condition is met, not TIMER_ConditionFlag.

Test and Return is defined as follows:
Name: TIMER_TestAndReturn
This name will be tested for by the timer to determine what behaviour is required. The name should be viewed as a prefix, so an activity with a name of TIMER_TestAndReturn_TwoWeeksToGo is a valid name.
Read only access to the following data items: STRING : TIMER_Condition plus any data items referenced in the value of TIMER_Condition.
Read/write access to the following data items:
INTEGER : TIMER_ConditionFlag
INTEGER : TIMER_StatusCode
The possible return values for the data items are:
TIMER_ConditionFlag is set to 0 if the condition is not met, and 1 if it is met.
TIMER_StatusCode is set to 0 if the time test could be carried out, or to one of the error codes defined below.

Test and Wait operation of a timer is defined as follows:
Activity name: TIMER_Wait
This name will be tested by the timer program to determine what behaviour is required. The name should be viewed as a prefix, so an activity with a name of TIMER_Wait_TwoWeeksBeforePromo is a valid name.
Read only access to the following data items:
STRING : TIMER_Conditionplus any data items referenced in the value of TIMER_Condition.
Read/write access to the following data items:
INTEGER : TIMER_StatusCode
The possible return values for the data items are:
TIMER_StatusCode is set to 0 if the time test could be carried out, or to one of the error codes defined below.

Regarding status codes, a TIMER_StatusCode will be set to 0, unless a problem occurs which makes it impossible to evaluate the time condition. These error codes are defined to help troubleshooting:

| | |
|---|---|
| 1 | An undefined error occurred that meant the condition could not be tested properly. |
| 2 | The condition string in TIMER_Condition refers to a data item that is not available |
| 3 | The TIMER_ConditionFlag or TIMER_StatusCode data items are not available or do not have the correct access (read/write). |
| 4 | The format or data type of TIMER_Condition is wrong |
| 5 | A value in one of the data items referred to in TIMER_Condition is incorrect, or of the wrong data type |

When the TIMER_StatusCode is non-zero, the value of TIMER_ConditionFlag, if being returned, should be treated as undefined.

A descriptive string detailing the error should be returned in the data item TIMER_DiagnosticMessage.

Regarding time comparison functions, the timers support the ability to compare calculated time with the current time. The supported comparisons are relative to current time:
Calculated time, C, is before current time, T (C<T)
Calculated time is after current time (C>T)
The behaviour of the timer will depend on the operating mode:

| Operating Mode | Comparison Result | Behaviour |
|---|---|---|
| Test and return | False | Set flag = False<br>Complete the activity |
| Test and return | True | Set flag = True<br>Complete the activity |
| Test and wait | False | No action |
| Test and wait | True | Complete the activity |

An example of how this works could be based upon the following case packet item variable values.
To test whether the current time is more than two weeks before a date stored in a case packet variable.

| Case Packet Variable | Data Type | Content |
| --- | --- | --- |
| TIMER_Condition | STRING | NOW < %MyDate% − %%MyOffset%% |
| MyDate | INTEGER | 987324962 |
| MyOffset | STRING | 14:00:00:00 |

The condition is checking whether the current date is before (less than) 2 weeks (14 days) before the date provided in MyDate, i.e. the condition is true if it is currently more than two weeks before MyDate. This sort of test must be rejected if it is a TestAndWait activity—anything testing for the current time before the calculated time must be a TestAndReturn. The state of the condition begins at TRUE and then changes to FALSE—once FALSE, it never subsequently becomes TRUE.

To wait until after 9am on the day after the promotion starts:

| Case Packet Variable | Data Type | Content |
| --- | --- | --- |
| TIMER_Condition | STRING | NOW > NEXT 0900 AFTER %PromoStart% + 01:00:00:00 |
| PromoStart | INTEGER | 987324962 |

The condition is adding one day to the promotion start and then tests for being after 0900 on that day.

The system may be expanded to include a supply chain decision support application which has the ability to aggregate data across sectors such as stores, geographical domains, and product categories. The suppliers and retailers would access the data for reporting purposes. This opens up the ability to run exception reports and alerts which may be defined in front end applets. A supply chain tracking application may be used to track deliveries and movement of goods. A collaborative supply chain management application may be incorporated to enable management of supply chain tracking and logistics consolidation through the use of collaborative processes using work flow which covers collation of picked goods for orders, creation of manifests, delivery scheduling, return of damaged goods and lead time management. Transport companies would benefit particularly form the logistics consolidation application.

Other possible applications include a short-life stock market application in which suppliers register their desire to either purchase or sell goods. This enables all interested parties including suppliers and retailers to monitor the market in real time. An order matching capability could automatically alert a match to a query and flash a trade message at both ends to allow confirmation of a sale. The system may also include a shopping mall application which allows suppliers to display goods information. It would include advertising, billing, payment clearing, and commission functions. A still further application which the system could incorporate is an in-store camera application which exploits real-video technology over the Internet or an intranet. For example, when a promotion is running, TV media images may be processed.

The application server 34 performs fault tolerance and allows expandability of the hardware configuration. It also performs load distribution. It is of the type marketed by NetDynamics™.

The supporting framework 33 comprises Java classes providing services such as database access, work flow engine (WFE) API links, remote data transfer with FTP capability, security links to security functions on the ICP 35, community management, usage tracking, exception handling, error handling, help, and audit log functions. Some of these services use parts of the system other than the backbone sub-system 20. For example, the usage tracking service accesses the Web server 14 in the gateway 10 to track accesses by the workstations 2. The remote data transfer service monitors traffic between the external retailer systems and the gateway 10. Other services use the backbone sub-system 20. For example, the exception handling service accesses the database 36 directly.

The supporting Internet Commerce Platform (or "extranet" platform) 35 performs community management, security, and access control operations in conjunction with the supporting framework 33. The community management features allow administration supervisors to set up users on the database and register them with the work flow engine 37 as described above. It is a very important link between external systems and the database 36 and the work flow engine 37. The community management functions also update resource rules tables for allocation of roles and work flow. It performs these operations in a seamless fashion as viewed by the user. For example, a Create New Team option allows an administrator to create a new team with a team name, a category, a supplier, a flavour, and a comment text input. It also presents screens allowing creation of a role flavour, a role, a team, and team members. It also allows these data items to be easily modified. The community management function comprises two parts, one which interfaces with the external (retailer or supplier) system and one which interfaces with the work flow engine, the applications, and the database 36.

The community management function defines:
  service users,
  an application view of the service users,
  containment of each service user in one or more teams,
  a "flavour" for each team, such as "large" or "medium", each flavour being a collection of roles, and
  roles as variants of role types.

Within the work flow engine 37, each role has associated activities and each activity has an associated code. The community management function also provides the following:
  Ability for a user to hold more than one role but retain a single worklist queue.
  Ability for the role(s) to be associated with different activities, for example, a user may have ten buyer activities in one team and twenty buyer activities in another team.
  Allow authorised users to manipulate the activities associated with already established teams.
  Allow users to appoint Second(s) in order to accommodate planned and unplanned absences.
  Ability to manage the activities that a Second may undertake.
  Ability for privileged users to manage access control rules (for both screens and functionality contained within screens) through the association of resource rules with roles held by the users.
  Ability for users to create and manage teams within the confines of the access control rules.
  Ability to manage email notifications and association with criteria for the notifications.
  Allow for the management and definition of the rules by which activities are to be distributed within a team.
  Definition of a Default Team, which can be used as a model for team creation.

Allows for the global assignment of one user's activities to another user.

The supporting framework 33 and the ICP 35 also handle exceptions in an effective manner. An exception instruction typically comprises data specifying product, time, location, and threshold information. For example, the system may be required to transmit at a certain time every week a report on trading in a particular shop to a remote management office. Exceptions are typically set up by an application.

Figure 3:
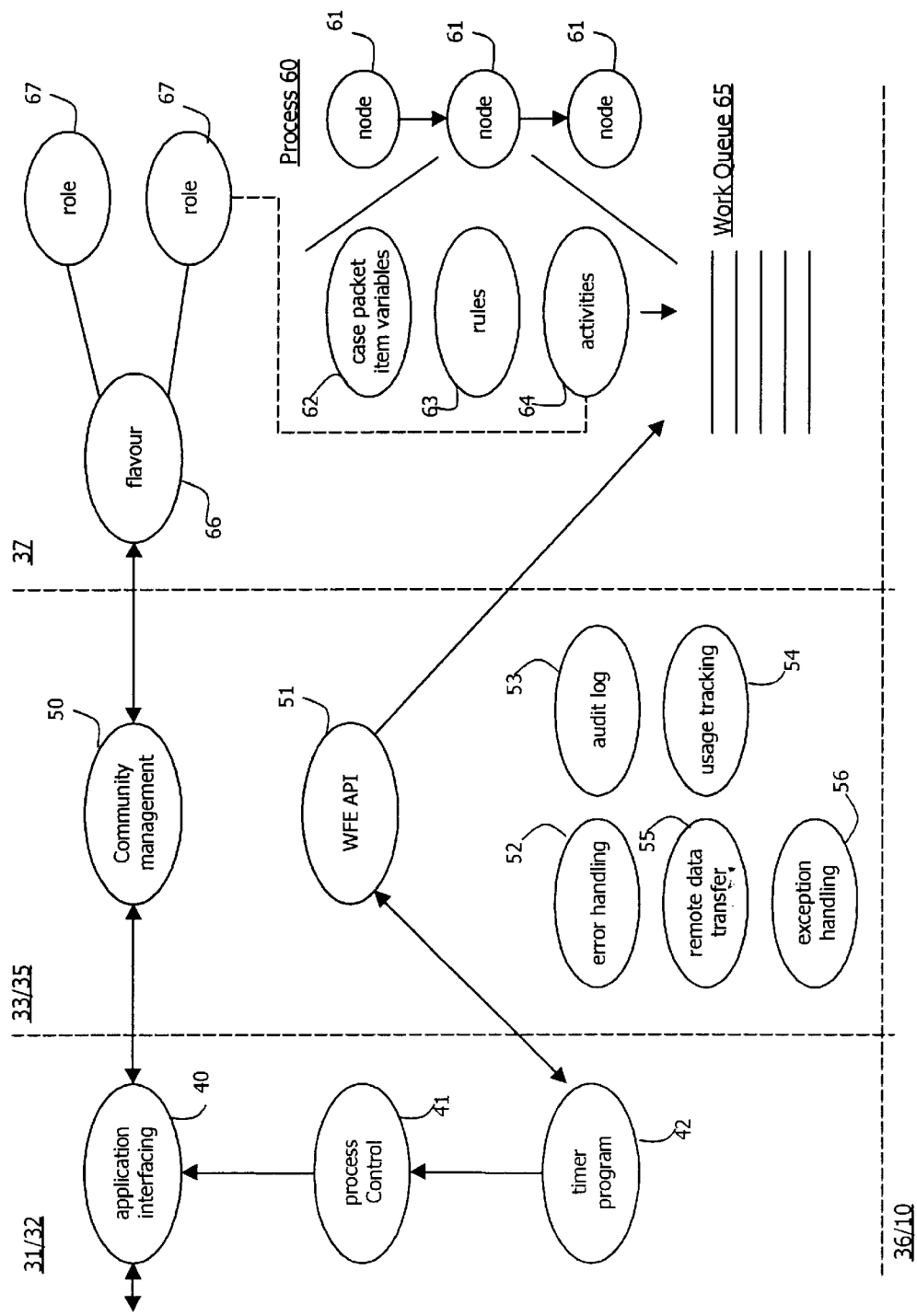
FIG. 3 is an entity diagram illustrating relationships between entities in the system 1.

Referring now to FIG. 3 the relationships between the various entities in the system 1 described above are illustrated diagrammatically. An application 32 has user interfacing programs 40 which interact with the presentation layer 31 under control of process control programs 41. The programs 41 in turn receive inputs from a timer program 42. In the supporting framework 33/ICP 35 layers a community management function 50 interacts with the application 32 and with the WFE 37 to create role flavours 66 having roles 67. The layers 33 and 35 also comprises APIs 51 allowing access of the timer program 42 to work queues 65 in the WFE 37. The layers 33/35 also comprises an error handling function 52, an audit log function 53, a usage tracking function 54, a remote data transfer function 55, and an exception handling function 56, all of which interact with the gateway 10 and the database 36 in addition to the applications 32.

In the WFE 37 a compiled process 60 has process rules 63, and activities 64. The rules 64 govern transfer of the activities 64 to the work queues 61, and the community management function 50 governs association of roles 67 with activities 64.

It will thus be appreciated that the invention provides for very comprehensive interaction by all supply chain parties with excellent security of access through the gateway 10. Use of WFE queue management facilities is optimised because of the process node 61 structure, the manner of transfer of activities 64 to work queues 65, and association of roles with flavours 66 and with activities 64. The layers 33 and 35 provide comprehensive support for the applications 32 because of the different "directions" of interaction with the database 36, with the WFE 37, with the gateway 10, and with the applications 32.

The system thus allows for example joint inputs by both a retailer and its suppliers of details of a promotion. The applications control attributes of the gateway 10 to prevent supplier access to promote retailer data routed to the database 36 for the benefit of the retailer.

The invention is not limited to the embodiments described, but may be varied in construction and detail.

What is claimed is:

1. A trading information exchange system comprising:
an application layer comprising applications;
a supporting framework of services for the application for handling trading information;
a database;
a collaborative work flow engine accessible by the applications; and
a gateway configured to allow supplier and retailer access to the applications,
wherein the supporting framework is configured to allow access of the applications to the work flow engine for work flow processing related to the trading information,
wherein the supporting framework is configured for accessing the gateway for monitoring supplier and retailer access to the applications, and
wherein the supporting framework comprises a community management function for interacting with a commerce platform to relate users to roles, wherein users belonging to external suppliers and retailers are associated with roles, for directly accessing the trading information exchange system that integrates the workflow across a supply chain that generates the trading information exchanged,
wherein the applications and the work flow engine are configured for interfacing to control work flow with process nodes, each node comprising an activity, a variable, and rules defining routing of an activity to a work queue,
further comprising a timer for controlling exit from a process node or entry to a process node according to activity status,
wherein said timer comprises a timer program in an application and a work queue in the work flow engine, said timer program programmed for accessing the work queue to determining activity status.

2. A system as claimed in claim 1, wherein the gateway comprises a firewall for security of accesses.

3. A system as claimed in claim 1, wherein the gateway comprises a proxy server for handling retailer and supplier accesses and for routing access requests through a selected application.

4. A system as claimed in claim 1, wherein the gateway comprises a router for allowing import of data from a retailer to the database in a structured manner.

5. A system as claimed in claim 1, wherein the applications, the database, and the work flow engine reside on separate servers interconnected in a network.

6. A system as claimed in claim 5, wherein the gateway is linked to the application server.

7. A system as claimed in claim 1, wherein the supporting framework comprises a remote data transfer function for accessing the gateway to monitor transfer of data from retailer and supplier systems and for reporting to an application.

8. A system as claimed in claim 1, wherein the supporting platform comprises error handling, audit log, and exception handling functions for accessing the database, processing retrieved data, and for reporting to an application.

9. A system as claimed in claim 1, wherein the community management function associates roles with activities.

10. A system as claimed in claim 1, wherein the system further comprises an applications server is configured for dynamically distributing load across hardware resources.

11. A system as claimed in claim 10, wherein the applications server resides between the commerce platform on one side and the database and the work flow engine on the other.

12. A system as claimed in claim 1, wherein said timer program is configured for:
opening an activity in the work queue,
obtaining status data from the activity,
performing a time comparison,
setting a value indicating the result of the comparison, and
submitting the activity for completion of the process node if the time comparison fulfils a condition.

13. A system as claimed in claim 1, wherein said timer program is configured for performing a test and return operation in which it accesses a work queue and waits for completion of an activity before activating a next process node.

14. A system as claimed in claim 1, wherein said timer program is configured for performing a test and return operation in which it accesses a work queue and immediately checks the activity status.

15. A system as claimed in claim 1, wherein the supporting framework community management function is configured for defining for the work flow engine service users, an application view of the service users, containment of each service user in a team, and a role for a service user.

16. A system as claimed in claim 15, wherein the community management function is configured for defining a flavour for each team, each flavour being a collection of roles.

17. A system as claimed in claim 16, wherein roles are variants of role types.

18. A system as claimed in claim 17, wherein the community management function is configured for defining role types in both the work flow engine and in an application.

19. A system as claimed in claim 18, wherein the community management is configured for defining activities for each role and each activity has an associated code.

20. A trading information exchange system comprising:
an application layer comprising applications for handling trading information;
a supporting framework of services for the application;
a collaborative work flow engine accessible by the applications;
a gateway configured to allow suppliers and retailers access to the applications;
wherein the supporting framework is configured to allow access of the applications to the work flow engine for work flow processing related to the trading information,
wherein the supporting framework is configured for accessing the gateway for monitoring supplier and retailer access to the applications; and
wherein the supporting framework comprises a community management function that interacts with a commerce platform to relate users to roles, and wherein users belonging to external suppliers and retailers are associated with roles, for directly accessing the trading information exchange system that integrates the workflow across a supply chain that generates the trading information exchanged,
wherein the applications and the work flow engine are configured for interfacing to control work flow with process nodes, each node comprising an activity, a variable, and rules defining routing of an activity to a work queue,
further comprising a timer for controlling exit from a process node or entry to a process node according to activity status,
wherein said timer comprises a timer program in an application and a work queue in the work flow engine, said timer program programmed for accessing the work queue to determine activity status.

21. A computer readable data medium having program code recorded thereon for providing a trading information exchange system, the program code configured to interact with computer systems to perform the following steps:
providing an application layer comprising applications for handling trading information;
providing a supporting framework of services; and
providing a collaborative work flow engine accessible by the applications;
wherein the supporting framework is configured to allow access of the applications to the work flow engine for work flow processing related to the trading information,
wherein the supporting framework is configured for accessing a gateway that controls access to the applications by suppliers and retailers, and
wherein the supporting framework comprises a community management function that relates users to roles, wherein users belonging to external suppliers and retailers are associated with roles, for directly accessing the trading information exchange system that integrates the workflow across a supply chain that generates the trading information exchanged,
wherein the applications and the work flow engine are configured for interfacing to control work flow with process nodes, each node comprising an activity, a variable, and rules defining routing of an activity to a work queue,
further comprising providing a timer for controlling exit from a process node or entry to a process node according to activity status,
wherein said timer comprises a timer program in an application and a work queue in the work flow engine, said timer program programmed for accessing the work queue to determine activity status.

* * * * *